US011105929B2

(12) United States Patent
Guillemin et al.

(10) Patent No.: US 11,105,929 B2
(45) Date of Patent: Aug. 31, 2021

(54) METHOD FOR PREDICTING WIND SPEED IN THE ROTOR PLANE FOR A WIND TURBINE EQUIPPED WITH A LIDAR SENSOR

(71) Applicant: IFP Energies nouvelles, Rueil-Malmaison (FR)

(72) Inventors: Fabrice Guillemin, Rueil-Malmaison (FR); Hoai-Nam Nguyen, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/821,049

(22) Filed: Mar. 17, 2020

(65) Prior Publication Data
US 2020/0301020 A1 Sep. 24, 2020

(30) Foreign Application Priority Data
Mar. 18, 2019 (FR) .................................... 19/02.739

(51) Int. Cl.
*G01W 1/00* (2006.01)
*G01S 17/95* (2006.01)
*F03D 17/00* (2016.01)
*G01S 17/58* (2006.01)

(52) U.S. Cl.
CPC .............. *G01S 17/95* (2013.01); *F03D 17/00* (2016.05); *G01S 17/58* (2013.01)

(58) Field of Classification Search
CPC ........... G01S 17/95; G01S 17/58; F03D 17/00
USPC ............................................................. 702/3
See application file for complete search history.

(56) References Cited

U.S. PATENT DOCUMENTS

| 10,519,929 | B2 * | 12/2019 | Hiremath | ............... F03D 7/0204 |
| 10,683,842 | B2 * | 6/2020 | Chu | ..................... F03D 7/0276 |
| 10,744,811 | B2 * | 8/2020 | Herrington | ...... G06K 19/07722 |
| 2014/0167415 | A1 | 6/2014 | Mykhaylyshyn | |
| 2015/0145253 | A1 * | 5/2015 | Bayon | ..................... F03D 17/00 290/44 |
| 2018/0017039 | A1 * | 1/2018 | Davoust | .................. G01S 17/95 |

FOREIGN PATENT DOCUMENTS

EP 3273055 A1 1/2018

OTHER PUBLICATIONS

Preliminary Search Report for FR 19/02,739, dated Nov. 13, 2019.
Eric Smiley et al.: "Investigation of the impact of the upstream induction zone on lidar measurement accuracy for wind turbine control applications, using large-eddy simulation", in Journal of Physics: Conference Series, vol. 524. 1. IOP Publishing, 2014, p. 012003.
(Continued)

*Primary Examiner* — Aditya S Bhat
(74) *Attorney, Agent, or Firm* — Fitch, Even, Tabin & Flannery LLP

(57) ABSTRACT

The present invention is a method for predicting the wind speed in the rotor plane (PR) of a wind turbine (1), by accounting for an induction factor used in a wind evolution model implemented by a Kalman filter. The invention also is a method for controlling a wind turbine (1), a computer program product, a LiDAR sensor (2) and a wind turbine (1), which uses the wind prediction determined with the method according to the invention.

12 Claims, 3 Drawing Sheets

(56) References Cited

OTHER PUBLICATIONS

Eric Smiley et al.: "Lidar wind speed measurements of evolving wind fields", in 50th AIAA Aerospace Sciences Meeting including the New Horizons Forum and Aerospace Exposition, 2012, p. 656).
Ashim Giyanani et al: "Estimation of rotor effective wind speeds using autoregressive models on LiDAR data", in Journal of Physics: Conference Series, vol. 753. 7. IOP Publishing, 2016, p. 072018.
Eric Simley et al: "Characterization of wind velocities in the upstream induction zone of a wind turbine using scanning continuous-wave lidars", Journal of Renewable and Sustainable Energy, vol. 8, No. 1, (Jan. 1, 2016).

* cited by examiner

METHOD FOR PREDICTING WIND SPEED IN THE ROTOR PLANE FOR A WIND TURBINE EQUIPPED WITH A LIDAR SENSOR

CROSS-REFERENCE TO RELATED APPLICATIONS

This application claims priority from French Patent application Ser. No. 19/02,739, filed Mar. 18, 2019, the contents of which are incorporated herein by reference in their entirety.

BACKGROUND OF THE INVENTION

Field of the Invention

The present invention relates to the field of renewable energies and more particularly to the measurement of the resource of wind turbines, having wind prediction, and at least one turbine control (orientation, torque and speed regulation), diagnosis and monitoring objectives.

Description of the Prior Art

A wind turbine allows the kinetic energy from wind to be converted into electrical or mechanical energy. For conversion of wind to electrical energy, it is made up of the following elements:

a tower allowing a rotor to be positioned at a sufficient height to enable motion thereof (necessary for horizontal-axis wind turbines) or the rotor to be positioned at a height enabling it to be driven by a stronger and more regular wind than at ground level. The tower generally houses part of the electrical and electronic components (modulator, control, multiplier, generator, etc.), a nacelle mounted at the top of the tower, housing mechanical, pneumatic and some electrical and electronic components necessary to operate the machine. The nacelle can rotate to orient the machine in the right direction, a rotor fastened to the nacelle, comprising several blades (generally three) and the nose of the wind turbine. The rotor is driven by wind power and it is connected by a mechanical shaft, directly or indirectly (via a gearbox and mechanical shaft system), to an electrical machine (electrical generator) that converts the energy recovered to electrical energy. The rotor is potentially provided with control systems such as variable-angle blades or aerodynamic brakes, a transmission made up of two shafts (mechanical shaft of the rotor and mechanical shaft of the electrical machine) connected by a transmission (gearbox).

Since the beginning of the 1990s, there has been renewed interest in wind power, in particular in the European Union where the annual growth rate is about 20%. This growth is attributed to the inherent possibility for carbon-emission-free electricity generation. In order to sustain this growth, the energy yield of wind turbines still has to be improved. The prospect of wind power production increasing requires developing effective production tools and advanced control tools in order to improve the performances of the machines. Wind turbines are designed to produce electricity at the lowest possible cost. They are therefore generally built so as to reach their maximum performance at a wind speed of approximately 15 m/s. It is not necessary to design wind turbines that maximize their yield at higher wind speeds, which are not common. In case of wind speeds above 15 m/s, it is necessary to lose part of the additional energy contained in the wind to avoid damage to the wind turbine. All wind turbines are therefore designed with a power regulation system.

For this power regulation, controllers have been designed for variable-speed aerogenerators. The purpose of the controllers is to maximize the electrical power recovered, to minimize the rotor speed fluctuations, and to minimize the fatigue and the extreme moments of the structure (blades, tower and platform).

To optimize control, it is important to know the wind speed at the rotor of the wind turbine. Various techniques have been developed to that end.

According to a first technique, using an anemometer allows estimation of a wind speed at one point, but this imprecise technology does not enable measuring an entire wind field or to know the three-dimensional components of the wind speed.

According to a second technique, a LiDAR (Light Detection And Ranging) sensor can be used. LiDAR is a remote sensing or optical measurement technology based on the analysis of the properties of a beam returned to the emitter. This method is notably used for determining the distance to an object by use of a pulse laser. Unlike radars based on a similar principle, LiDAR sensors use visible or infrared light instead of radio waves. The distance to an object or a surface is given by the measurement of the delay between the pulse and the detection of the reflected signal.

In the field of wind turbines, LiDAR sensors are announced as essential for proper functioning of large wind turbines, especially now that their size and power is increasing (today 5 MW, soon 12 MW for offshore turbines). This sensor allows remote wind measurements, first allowing wind turbines to be calibrated to deliver maximum power (power curve optimization). For this calibration stage, the sensor can be positioned on the ground and vertically oriented (profiler), which allows measuring the wind speed and direction, as well as the wind gradient depending on the altitude. This application is particularly critical because it allows knowing the energy generating resource. This is important for wind turbine projects since it conditions the financial viability of the project.

A second application sets this sensor on the nacelle of the wind turbine in order to measure the wind field in front of the turbine while being nearly horizontally oriented. A priori, measuring the wind field in front of the turbine allows knowing in advance the turbulence of the wind that the turbine is going to encounter shortly thereafter. However, current wind turbine control and monitoring techniques do not allow accounting for of a measurement performed by a LiDAR sensor by estimating precisely the speed of the wind at the rotor, that is in the rotor plane. Such an application is notably described in French patent application FR-3-013, 777 corresponding to US published application 2015/145,253.

Furthermore, advanced wind turbine controllers can be completed by a feedforward control based on predictive wind measurements provided by the LiDAR sensors in order to regulate the rotor speed and to reduce the structural load on the wind turbine. The efficiency of the feedforward control greatly depends on the accuracy with which the wind prediction can be measured or estimated.

The potential for use of LiDAR sensors for estimating the wind speed in the rotor plane has been studied. In general, to extrapolate the wind speed from the measurement distance closest to the LiDAR sensor, to 50 m for example, to the rotor plane, Taylor's frozen turbulence hypothesis (TFH) is applied. The main advantage of TFH lies in the simplicity thereof. However, TFH might not be accurate enough in practice. When using TFH for wind speed estimation, no consideration is given to the wind evolution, which is affected by the site conditions, the wind turbine blockage effects and the ever-changing physical nature of the wind. This results in a significant difference between the estimated wind speed in the rotor plane and the real speed of the wind that hits the rotor (see the documents: Eric Simley, Lucy Y Pao, Pieter Gebraad and Matthew Churchfield "Investigation of the Impact of the Upstream Induction Zone on Lidar Measurement Accuracy for Wind Turbine Control Applications, Using Large-Eddy Simulation", in the Journal of Physics: Conference Series, Vol. 524. 1.IOP Publishing, 2014, p. 012003, and Eric Simley, Lucy Pao, Neil Kelley, Bonnie Jonkman and Rod Frehlich "Lidar Wind Speed Measurements of Evolving Wind Fields", in $50^{th}$ AIAA Aerospace Sciences Meeting including the New Horizons Forum and Aerospace Exposition, 2012, p. 656).

In order to overcome the disadvantages associated with the use of TFH for wind speed estimation, an approach is considered in the document Ashim Giyanani, WAAM Bierbooms and GJW van Bussel "Estimation of Rotor Effective Wind Speeds Using Autoregressive Models on LiDAR Data", in the Journal of Physics: Conference Series, Vol. 753. 7. IOP Publishing, 2016, p. 072018. The basic concept models the wind field flow as an autoregressive moving average exogenous model. This model is trained on past measurements, which allows prediction of future wind speeds in the rotor plane. It is however not clear how the parameters of the model are determined. Furthermore, the model is static insofar as, once identified, it does not change with the wind conditions. This method can be difficult to implement in practice.

SUMMARY OF THE INVENTION

In order to predict the wind with accuracy (without Taylor's frozen turbulence hypothesis), the present invention relates to a method for predicting the wind speed in the rotor plane, by taking account of an induction factor that is used in a wind evolution model implemented by a Kalman filter. The induction factor and the wind evolution model allows accounting for the effects on the wind related to the turbine blockage in the prediction. Thus, the wind prediction at the rotor is accurate.

The invention also relates to a method for controlling a wind turbine, a computer program product, a LiDAR sensor and a wind turbine, with these applications using the wind prediction determined with the method according to the invention.

The present invention relates to a method for predicting the wind speed in the rotor plane of a wind turbine equipped with a LiDAR sensor, wherein the following steps are carried out:

a) measuring the wind speed in at least one measurement plane distant from the wind turbine by the LiDAR sensor;

b) determining a wind induction factor representing a wind deceleration coefficient between the measurement plane and the plane of the rotor;

c) determining a delay index between the measurement plane and the rotor plane of the wind turbine by use of the induction factor and of the wind speed measurement in the measurement plane;

d) constructing a wind evolution model between the measurement plane and the plane of the rotor, the wind evolution model connecting the wind speed in the plane of the rotor at a predetermined time to the measured wind speed in the measurement plane at times prior to the predetermined time, by use of the induction factor, the prior times being determined by use of the delay index; and e) determining the wind speed prediction in the rotor plane by use of the wind evolution model and of a Kalman filter, which preferably is an adaptive Kalman filter.

According to an embodiment of the invention, a wind induction factor is determined by carrying out the following steps:

i) measuring the wind speed in at least three measurement planes distant from the wind turbine by use of the LiDAR sensor;

ii) determining at least two wind induction factors between two of the measurement planes using the wind speed measurements in the measurement planes and a linear Kalman filter; and iii) determining the wind induction factor between a measurement plane and the rotor plane of the wind turbine by use of the determined induction factors between two measurement planes and using a linear Kalman filter.

According to an implementation, the wind speed measurement step comprises a sub-step of reconstructing the wind field in the measurement plane, wherein the reconstructed wind field is used in the other steps of the method as the wind speed measurement in the measurement plane.

According to an aspect, the delay index $k_{d0}$ is determined by an equation:

$$k_{d0} = \frac{2x_1}{(U_{x1} + U_0)T_s},$$

with $U_0 = a_{0,x_1} U_{x_1}$, with $x_1$ being the distance between the measurement plane and the rotor plane, $T_s$ being the measurement sampling period, $U_{x1}$ being the average wind speed measured in the measurement plane, $U_0$ being the average wind speed in the rotor plane and $a_{0,x1}$ being induction factor between the measurement plane and the rotor plane.

According to a feature, the wind evolution model is written as follows:

$$u_0(k+p) = \tilde{U}_{x_1}(k-k_{d0}+p)^T r(k|k),$$

with $$\tilde{U}_{x_1}(k-k_{d0}+p) = [\tilde{u}_{x_1}(k-k_{d0}+p)\tilde{u}_{x_1}(k-k_{d0}+p-1)\tilde{u}_{x_1}(k-k_{d0}+p+1) \ldots \tilde{u}_{x_1}(k-k_{d0}+p+N_d)]^T$$

and $\tilde{u}_{x_1}(k) = a_{0,x_1} u_{x_1}(k)$, with $u_0$ being the wind in the rotor plane, k being the discretized time, p being the future time step, $k_{d0}$ being the delay index, r being the state vector determined by the Kalman filter, $x_1$ being the measurement plane, $N_d$ being the order of the wind evolution model, $u_{x1}$ being the wind speed measured in the measurement plane and $a_{0,x1}$ being induction factor between the measurement plane and the rotor plane.

Advantageously, the order of the wind evolution model $N_d$ is 2.

Furthermore, the invention relates to a method of controlling a wind turbine equipped with a LiDAR sensor, wherein the following steps are carried out:

a) determining the wind speed prediction in a rotor plane of the wind turbine by use of the method according to one of the above features; and b) controlling the wind turbine as a function of the wind speed in the rotor plane.

The invention also relates to a computer program product comprising code instructions when executed by a processor for carrying out the steps of a method according to one of the above features, when the program being executed on a processor which provides processing for the LiDAR sensor.

Furthermore, the invention relates to a LiDAR sensor for a wind turbine comprising a processing unit implementing a method according to one of the above features.

Moreover, the invention relates to a wind turbine comprising a LiDAR sensor according to one of the above features, the LiDAR sensor being preferably arranged on the nacelle of the wind turbine or in the nose of the wind turbine.

BRIEF DESCRIPTION OF THE DRAWINGS

Other features and advantages of the method according to the invention will be clear from reading the description hereafter of embodiments given by way of non-limitative example, with reference to the accompanying drawings wherein.

DETAILED DESCRIPTION OF THE INVENTION

The present invention relates to a method for predicting the wind speed in the rotor plane of a wind turbine equipped with a LiDAR sensor. The method enables prediction of the wind speed because it allows determination for at least one future time the wind speed in the rotor plane of the turbine.

According to the invention, the LiDAR sensor allows measurement of the wind speed in at least one measurement plane upstream from the wind turbine. There are several types of LiDAR sensors, for example scanning LiDAR, continuous wave LiDAR or pulsed LiDAR sensors. Within the context of the invention, a pulsed LiDAR is preferably used. However, the other LiDAR technologies may also be used while remaining within the scope of the invention.

LiDAR sensors allow fast measurement. Therefore, using such a sensor enables fast and continuous determination of the wind speed prediction. For example, the sampling rate of the LiDAR sensor can range between 1 and 5 Hz (or even more in the future), and it can be 4 Hz. Furthermore, the LiDAR sensor allows obtaining data relative to the wind upstream from the wind turbine. This data is related to the wind that is going to hit the turbine. The LiDAR sensor can therefore be used for predicting the wind speed in the rotor plane of the wind turbine.

Figure 1:
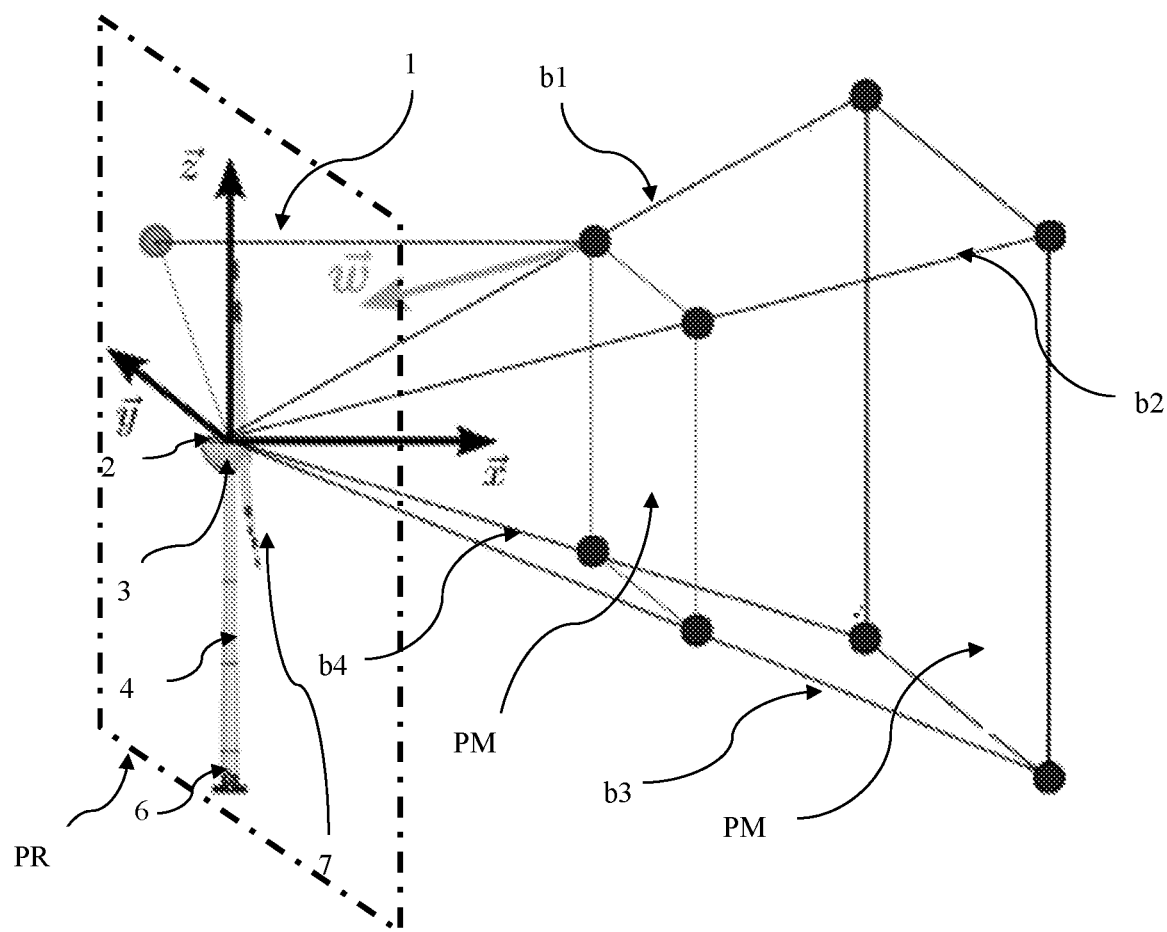
FIG. 1 illustrates a wind turbine equipped with a LiDAR sensor according to an embodiment of the invention.

FIG. 1 schematically shows, by way of non-limitative example, a horizontal-axis wind turbine 1 equipped with a LiDAR sensor 2 for the method according to an embodiment of the invention. LiDAR sensor 2 is used to measure the wind speed at a given distance in multiple measurement planes PM (only two measurement planes are shown). Knowing the wind measurement in advance a priori allows providing much data. This figure also shows axes x, y and z. The reference point of this coordinate system is the center of the rotor. Direction x is the longitudinal direction corresponding to the direction of the rotor axis, upstream from the wind turbine. This direction also corresponds to the measurement direction of LiDAR sensor 2. Direction y, perpendicular to direction x, is the lateral direction located in a horizontal plane (directions x, y form a horizontal plane). Direction z is the vertical direction (substantially corresponding to the direction of tower 4) pointing up, axis z is perpendicular to axes x and y. The rotor plane is indicated by the rectangle in dotted line PR. It is defined by directions y, z for a zero value of x. Measurement planes PM are planes formed by directions y, z at a distance from rotor plane PR (for a non-zero value of x). Measurement planes PM are parallel to rotor plane PR.

Conventionally, a wind turbine 1 allows converting the kinetic energy of the wind into electrical or mechanical energy. To convert the wind energy to electrical energy, it is made up of the following elements:

a tower 4 allowing a rotor (not shown) to be positioned at a sufficient height to enable motion thereof (necessary for horizontal-axis wind turbines) or this rotor to be positioned at a height enabling it to be driven by a stronger and more regular wind than at ground level 6. Tower 4 generally houses part of the electrical and electronic components (modulator, control, multiplier, generator, etc.), a nacelle 3 mounted at the top of tower 4, housing mechanical, pneumatic and some electric and electronic components (not shown) necessary for operating the machine. Nacelle 3 can rotate to orient the machine in the right direction, the rotor, fastened to the nacelle, comprises several blades 7 (generally three) and the nose of the wind turbine. The rotor is driven by the energy from the wind and it is connected by a mechanical shaft, directly or indirectly (via a gearbox and mechanical shaft system), to an electrical machine (electric generator) (not shown) that converts the energy recovered to electrical energy. The rotor is potentially provided with control systems such as variable-angle blades or aerodynamic brakes, a transmission made up of two shafts (mechanical shaft of the rotor and mechanical shaft of the electrical machine) connected by a transmission (gearbox) (not shown).

As can be seen in FIG. 1, which is an example embodiment of a pulsed LiDAR sensor, the LiDAR sensor 2 used comprises four beams or measurement axes (b1, b2, b3, b4). By way of non-limitative example, the method according to the invention also operates with a LiDAR sensor comprising any number of beams. The LiDAR sensor performs a punctual measurement at each intersection point of a measurement plane PM and a beam (b1, b2, b3, b4). These measurement points are represented by black circles in FIG. 1. Processing the measurements at these measurement points allows determination of the wind speed in measurement planes PM. The wind modelling method described in French patent application FR-3,068,139 (WO-2018/234,409) can therefore notably be applied.

Preferably, LiDAR sensor 2 can be mounted on nacelle 3 of wind turbine 1.

According to the invention, the wind prediction method comprises the following steps:

1) Wind speed measurement
2) Induction factor determination
3) Delay index determination
4) Construction of a wind evolution model
5) Determination of the wind speed prediction.

These steps are carried out in real time.

Figure 2:
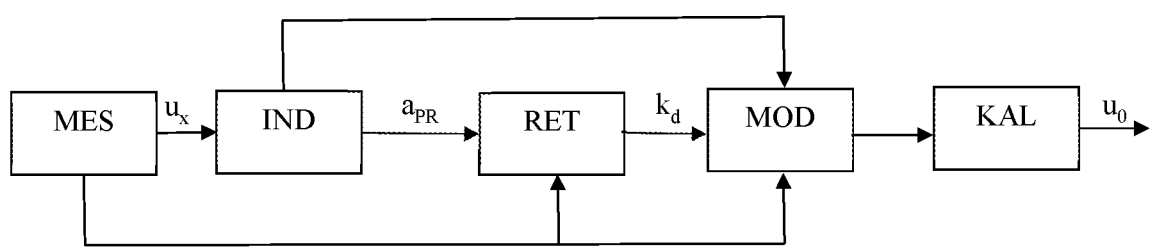
FIG. 2 illustrates the steps of the method for predicting the wind speed in the rotor plane according to an embodiment of the invention.

FIG. 2 schematically illustrates, by way of non-limitative example, the steps of the prediction method according to an embodiment of the invention. The first step is a step (MES) of measuring the wind speed $u_x$ in at least one measurement plane by use of the LiDAR sensor. The second step (IND) uses measurements $u_x$ to determine an induction factor $a_{PR}$ between the measurement plane and the rotor plane. The third step (RET) uses induction factor $a_{PR}$ and measurements $u_x$ to determine a delay index $k_d$. The fourth step is a step of constructing a wind evolution model (MOD) from measurements $u_x$, induction factor $a_{PR}$ and delay index $k_d$. A Kalman filter (KAL), notably an adaptive Kalman filter, is then applied to the wind evolution model (MOD) to obtain a prediction of the wind speed in the rotor plane $u_0$.

Figure 3:
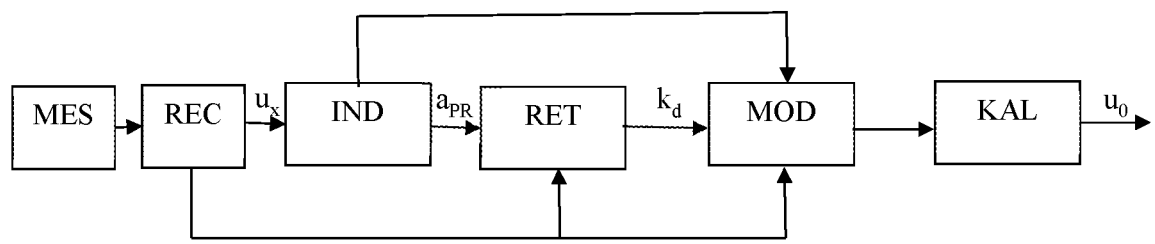
FIG. 3 illustrates the steps of the method for predicting the wind speed in the rotor plane according to a second embodiment of the invention.

FIG. 3 schematically illustrates, by way of non-limitative example, the steps of the prediction method according to a second embodiment of the invention. The first step is a step (MES) of measuring the wind speed in at least one measurement plane by means of the LiDAR sensor. In relation to the embodiment of FIG. 1, a step (REC) of reconstructing the wind from the measurements prior to determining wind speed $u_x$ in the measurement plane is added. The third step (IND) uses the reconstructed measurements $u_x$ to determine an induction factor $a_{PR}$ between the measurement plane and the rotor plane. The fourth step (RET) uses induction factor $a_{PR}$ and reconstructed measurements $u_x$ to determine a delay index $k_d$. The fifth step is a step of constructing a wind evolution model (MOD) from reconstructed measurements $u_x$, induction factor $a_{PR}$ and delay index $k_d$. A Kalman filter (KAL), notably an adaptive Kalman filter, is then applied to the wind evolution model to obtain a prediction of the wind speed in the rotor plane $u_0$.

1. Wind Speed Measurement

In this step, the wind speed is continuously measured in at least one measurement plane distant from the wind turbine, by using the LiDAR sensor. Thus, the wind speed can be known upstream from the wind turbine in at least one measurement plane. For this step, the three wind components (longitudinal, lateral and vertical) are considered, as well as the wind speed variations in the measurement plane (the wind speed increases with height for example).

According to an embodiment of the invention, the wind speed can be measured in at least three measurement planes to facilitate induction factor determination (see step 2). Preferably, the wind speed can be measured in four measurement planes to improve the accuracy of knowledge of the wind upstream from the wind turbine and, therefore, the accuracy of estimation of the wind induction factor in the rotor plane.

According to an implementation of the invention, the measurement planes can be located within a longitudinal distance (along axis x in FIG. 1) preferably ranging between 50 and 400 m from the rotor plane. It is thus possible to determine the evolution of the wind speed over a long distance upstream from the wind turbine, which increases the accuracy of estimation of the wind speed prediction in the rotor plane.

Alternatively, the measurement planes may be located at a shorter or a longer distance in relation to the aforementioned preferred range.

According to a non-limitative example embodiment, the LiDAR sensor can perform measurements for ten measurement planes, which can notably be located at distances of 50, 70, 90, 100, 110, 120, 140, 160, 180 and 200 m from the rotor plane respectively.

According to an implementation of the invention corresponding to the embodiment of FIG. 3, the wind measurement step can comprise a wind reconstruction step allowing the raw measurements of the LiDAR sensor to be interpreted. Various wind reconstruction methods can be implemented. By way of non-limitative example, the wind reconstruction method described in patent application FR-3,068, 139 (WO-2018/234,409), whose main steps are noted hereafter, may be implemented:

gridding the space located upstream from the LiDAR sensor, the grid pattern comprising estimation points and measurement points;

measuring the wind amplitude and direction at the different measurement points;

estimating the wind amplitude and direction at any time for all the estimation points, using a recursive least-squares method of a cost function; and reconstructing the incident wind field in three dimensions and in real time on all the discretized points.

2. Induction Factor Determination

This step determines a wind induction factor between a measurement plane and the rotor plane. The induction factor is a wind deceleration coefficient in the induction zone of the wind turbine (that is upstream from the turbine). Indeed, the wind is slowed down upstream from the turbine by the presence of the turbine and its operation: in other words, the power drawn from the wind by the turbine causes wind deceleration upstream from the turbine. Thus, the induction factor is representative of a physical phenomenon and it provides an indication relative to the resource of the wind turbine. The induction factor is calculated between two planes upstream from the turbine, by definition, it corresponds to the speed ratio between these planes. By denoting the induction factor, u the wind speed, and d1 and d2, the respective distances of the two planes considered in relation to the rotor plane, the induction factor between the planes located at distances d1 and d2 from the rotor plane can be written:

$$a_{d1,d2} = \frac{u_{d1}}{u_{d2}}$$

When one of the planes is considered in the rotor plane, d1=0.

For this step, the induction factor can be determined by any method. By way of non-limitative example, the method of determining an induction factor is disclosed in the French patent application FR-1,871,455, whose steps are described below, can be implemented.

The method of determining a wind induction factor between a measurement plane and the rotor plane of a wind turbine comprises the following steps:

A—Wind Speed Measurement

This step is identical to step 1) of the prediction method according to the invention for at least three measurement planes. Preferably, a single series of measurements can be performed for steps 1) and 2)A.

B—Determining Induction Factors Between Measurement Planes

This step determines in real time at least two wind induction factors between two measurement planes. In other words, at a minimum, a first induction factor is determined between a first measurement plane and a second measurement plane, and a second induction factor is determined between a third measurement plane and a fourth measurement plane (at maximum one of the third and fourth measurement planes corresponds to one of the first and second measurement planes). In a simplified manner, these induction factors are referred to as induction factors between measurement planes in the description hereafter.

According to the invention, the induction factors between measurement planes are determined by use of the wind speed measurements and of a Kalman filter, notably a linear Kalman filter.

Advantageously, for this step and for the embodiment where the measurement is performed for at least four measurement planes, at least three induction factors of the wind between measurement planes can be determined. It is thus possible to increase the accuracy of the wind deceleration phenomenon upstream from the wind turbine and, therefore, the accuracy of estimation of the wind induction factor in the rotor plane.

According to an embodiment of the invention, an induction factor between measurement planes can be determined for the measurement plane closest to the rotor plane, to obtain information relative to the wind field as close as possible to the rotor plane.

According to an implementation of the invention, the induction factors between measurement planes can be determined for measurement planes having the same spacing. For example, the spacing can be 50 m and a first induction factor can be determined for measurement planes located at 70 and 120 m, and a second induction factor for measurement planes located at 90 and 140 m.

Preferably, the spacing between the measurement planes used for the wind induction factors between measurement planes can be identical to the distance between the rotor plane and the closest measurement plane. Thus, the induction factor model is simplified, which notably facilitates solution of the Kalman filter.

For example, by combining the variants described above, if the first measurement plane is located at 50 m from the rotor plane, a first induction factor can be determined for measurement planes located at 50 and 100 m, a second induction factor for measurement planes located at 70 and 120 m, and a third induction factor for measurement planes located at 90 and 140 m.

According to an embodiment of the invention, the Kalman filter can be used with the different steps described hereafter. The steps are described for an embodiment where a first induction factor $a_{50,100}$ is determined for measurement planes located at 50 and 100 m, a second induction factor $a_{70,120}$ for measurement planes located at 70 and 120 m, and a third induction factor $a_{90,140}$ for measurement planes located at 90 and 140 m.

Below, it is only shown how to estimate $a_{50,100}$ in real time with $a_{70,120}$ and $a_{90,140}$ being obtained exactly in the same way. Since $u_{50}$, $u_{100}$ are available in real time, the induction factor definition equation could be directly used to determine $a_{50,100}$. However, this method involves drawbacks. Indeed, the information on the standard deviation of the estimated wind speeds $u_{50}$, $u_{100}$ is not used. The standard deviation of estimation $a_{50,100}$ can therefore not be known.

On the other hand, a calculation stability problem may occur for low speeds, i.e. when $u_{100}$ is close to zero.

The induction factor at the time k is denoted by $a_{50,100}(k)$. It is clear that the variation $a_{50,100}(k)-a_{50,100}(k-1)$ is relatively small, therefore it can be expressed as:

$$a_{50,100}(k)=a_{50,100}(k-1)+\eta(k-1)$$

where $\eta(k-1)$ is used to describe the variation of $a_{50,100}(k)$ over time.

The first induction factor definition equation is rewritten as:

$$u_{100}(k)a_{50,100}(k)=u_{50}(k).$$

Since estimations $u_{50}(k)$, $u_{100}(k)$ contain noise, a more realistic model of the above equation is:

$$(u_{100}(k)+\epsilon_{100}(k))a_{50,100}(k)=u_{50}(k)+\epsilon_{50}(k)$$

where $\epsilon_{50}(k)$, $\epsilon_{100}(k)$ are the noises for $u_{50}(k)$, $u_{100}(k)$ respectively. The previous equation can then be rewritten as follows:

$$u_{100}(k)a_{50,100}(k)=u_{50}(k)+\epsilon_{50}(k)-\epsilon_{100}(k)a_{50,100}(k)$$

By combining the previous equations, the following equation of state is obtained:

$$\begin{cases} a_{50,100}(k) = a_{50,100}(k-1) + \eta(k-1), \\ u_{50}(k) = u_{100}(k)a_{50,100}(k) + \mu(k) \end{cases}$$

$$\mu(k) = \epsilon_{100}(k)a_{50,100}(k) - \epsilon_{50}(k)$$

One way of estimating the unknown state vector $a_{50,100}(k)$ that can account for information on $\epsilon(k)$ and $\mu(k)$ applies a Kalman filtering algorithm referred to as Kalman filter. In practice, this filter provides the solution to the following problem:

$$\min_{a_{50,100}(k)} J(k)$$

with $$J(k) = (a_{50,100}(0) - \bar{a}_{50,100}(0))^T P_0^{-1}(a_{50,100}(0) - \bar{a}_{50,100}(0)) + \sum_{j=1}^{k} (\eta(j-1)^T Q^{-1}\eta(k-1) + \mu(j)^T R^{-1}\mu(j))$$

where $P_0$, Q, R are weighting matrices of suitable dimension, $a_{50,100}(0)$ with an overbar is the mean value of initial state $a_{50,100}(0)$.

In order to solve the optimization problem using the Kalman filtering algorithm, the following assumptions are made. These assumptions mainly relate to a mathematical interpretation for $P_0$, Q, R.

$a_{50,100}(0)$ is a random vector not correlated with noises $\epsilon(k)$ and $\mu(k)$, $a_{50,100}(0)$ has a known mean with P0 as the covariance matrix, that is:

$$P_0 = E[(a_{50,100}(0) - \bar{a}_{50,100}(0))(a_{50,100}(0) - \bar{a}_{50,100}(0))^T]$$

with $\bar{a}_{50100}(0)$ being the mean value of the initial state, $\epsilon(k)$ and $\mu(k)$ are white noises with zero mean and not correlated with covariance matrices Q and R respectively, i.e.:

$$E[\eta(k)\eta(j)^T] = \begin{cases} Q, & \text{if } k = j, \\ 0, & \text{if } k \neq j \end{cases}$$

$$E[\mu(k)\mu(j)^T] = \begin{cases} R, & \text{if } k = j, \\ 0, & \text{if } k \neq j \end{cases}$$

$$E[\eta(k)\mu(j)^T] = 0, \text{ for all } k, j$$

It is noted that this assumption also implies that Q and R are positive semi-definite symmetric matrices.

The following notations are adopted:

$\hat{a}_{50,100}(k|k-1)$ is the estimation of $a_{50,100}(k)$ given the time measurements k−1.

$\hat{a}_{50,100}(k|k)$ is the estimation of $a_{50,100}(k)$ given the time measurements k.

$P(k|k-1)$ is the covariance matrix of $a_{50,100}(k)$ given the time measurements k−1.

$P(k|k)$ is the covariance matrix of $a_{50,100}(k)$ given the time measurements k.

The Kalman filtering algorithm can then be summarized as follows:

Time update equation:

$$\begin{cases} \hat{a}_{50,100}(k|k-1) = \hat{a}_{50,100}(k-1|k-1) \\ P(k|k-1) = P(k-1|k-1) + Q \end{cases}$$

Measurement update equation:

$$\begin{cases} K(k) = P(k|k-1)u_{100}(k)^T(P(k|k-1) + u_{100}(k)Ru_{100}(k)^T)^{-1} \\ \hat{a}_{50,100}(k|k) = \hat{a}_{50,100}(k|k-1) + K(k)(u_{50}(k) - u_{100}(k)\hat{x}(k|k-1)), \\ P(k|k) = (I - K(k))P(k|k-1) \end{cases}$$

By carrying out these steps, induction factor $a_{50,100}$ can be determined. These steps are repeated to determine induction factors $a_{70,120}$ and $a_{90,140}$.

C—Determining the induction factor between a measurement plane and the rotor plane This step determines in real time the wind induction factor between one of the measurement planes and the rotor plane. Thus, the evolution of the wind at the rotor can be represented by accounting for the physical phenomena, in particular the wind deceleration. According to the invention, the wind induction factor between a measurement plane and the rotor plane is determined by use of the induction factors determined in the previous step and using a Kalman filter, notably a linear Kalman filter. To simplify, this induction factor is referred to as induction factor in the rotor plane in the description hereafter.

Preferably, the wind induction factor can be determined between the measurement plane closest to the rotor and the rotor plane.

For example, in this step, the induction factor can be determined between a measurement plane located 50 m from the rotor and the rotor plane.

According to an embodiment of the invention, the Kalman filter can be used by applying the various steps described below. The steps are described for an embodiment for which $a_{50,100}$, $a_{70,120}$ and $a_{90,140}$ have been determined and for which $a_{0,50}$ is determined, that is the induction factor between a measurement plane located at 50 m and the rotor plane.

Using $a_{50,100}$, $a_{20,120}$ and $a_{90,140}$, the main idea of the estimation of $a_{0,50}$ is to assume that $a_{0,50}$, $a_{50,100}$, $a_{70,120}$ and $a_{90,140}$ are a function of distance. The following relation is therefore assumed:

$$\begin{cases} a_{0,50} = 0x_1 + x_2, \\ a_{50,100} = 50x_1 + x_2, \\ a_{70,120} = 70x_1 + x_2, \\ a_{90,140} = 90x_1 + x_2 \end{cases}$$

where $x_1$, $x_2$ are unknown parameters that need to be determined. Since $a_{50,100}$, $a_{70,120}$ and $a_{90,140}$ change slowly over time, the same applies to $x_1$, $x_2$. We can express the relationships:

$$\begin{cases} x_1(k) = x_1(k-1) + \zeta_1(k-1), \\ x_2(k) = x_2(k-1) + \zeta_2(k-1) \end{cases}$$

where $\zeta_1(k)$, $\zeta_2(k)$ are used to characterize the variation of $x_1(k)$, $x_2(k)$. This relationship is expressed as:

$$x(k) = \begin{bmatrix} x_1(k) \\ x_2(k) \end{bmatrix}, \zeta(k) = \begin{bmatrix} \zeta_1(k) \\ \zeta_2(k) \end{bmatrix}$$

Then the relationship can be expressed in compact form:

$$x(k) = x(k-1) + (k-1).$$

A more realistic model accounting for the noises is:

$$\begin{cases} a_{50,100}(k) = [50 \quad 1]x(k) + \epsilon_1(k), \\ a_{70,120}(k) = [70 \quad 1]x(k) + \epsilon_2(k), \\ a_{90,140}(k) = [90 \quad 1]x(k) + \epsilon_3(k), \end{cases}$$

wherein $\epsilon_1$, $\epsilon_2$, $\epsilon_3$ are the noises of estimations $a_{50,100}(k)$, $a_{70,120}(k)$ and $a_{90,140}(k)$ which can then be expressed as:

$$y(k) = \begin{bmatrix} a_{50,100}(k) \\ a_{70,120}(k) \\ a_{90,140}(k) \end{bmatrix}, C = \begin{bmatrix} 50 & 1 \\ 70 & 1 \\ 90 & 1 \end{bmatrix}, \epsilon(k) = \begin{bmatrix} \epsilon_1(k) \\ \epsilon_2(k) \\ \epsilon_3(k) \end{bmatrix}$$

Then the relationship can be expressed in compact form as:

$$y(k) = Cx(k) + \epsilon(k).$$

By combining the previous equations, the equation of state is as follows:

$$\begin{cases} x(k) = x(k-1) + \zeta(k-1) \\ y(k) = Cx(k) + \epsilon(k) \end{cases}$$

As for $a_{50,100}(k)$, $a_{70,120}(k)$ and $a_{90,140}(k)$, one way of obtaining $x(k)$ that accounts for noises $\zeta(k)$, $\epsilon(k)$ uses the linear Kalman filter technique. The same steps as those described for the previous step are therefore applied.

Once x(k) is estimated, induction factor $a_{0,50}$ can be calculated as follows:

$$a_{0,50}(k)=[01]x(k).$$

3. Delay Index Determination

This step determines a delay index by use of the wind speed measurements (optionally the reconstructed measurements) and by use of the induction factor. The delay index defines the time delay of the wind between the measurement plane and the rotor plane of the wind turbine. The dependence of the delay index on the induction factor allows accounting for physical phenomena (induction) when determining the delay, which makes the wind prediction more representative of real conditions.

According to an embodiment of the invention, the delay index $k_{d0}$ can be expressed by an equation:

$$k_{d0} = \frac{2x_1}{(U_{x1} + U_0)T_s}$$

$$U_0 = a_{0,x_1} U_{x_1}$$

with $x_1$ being the distance between the measurement plane and the rotor plane, $T_s$ being the measurement sampling period, $U_{x_1}$ being the average wind speed measured in the measurement plane (determined from the measurements), $U_0$ being the average wind speed in the rotor plane and $a_{0,x1}$ being the induction factor between the measurement plane and the rotor plane determined in the previous step.

4. Construction of a Wind Evolution Model

This step constructs a wind evolution model. A wind evolution model provides the evolution of the wind speed between the measurement plane and the rotor plane of the wind turbine. The wind evolution model connects the wind speed in the rotor plane at a predetermined time t1 (t1 being a future time, the time of the wind speed prediction in the rotor plane) to the wind speed measured in the measurement plane at several times prior to time t1, by use of the induction factor. The times prior to time t1 are determined by use of the delay index. The dependence of the wind evolution model on the induction factor and the delay index allows accounting for physical phenomena (induction) when determining the wind evolution, which makes the wind prediction more representative of real conditions. Furthermore, considering prior times allows accounting for a larger amount of data relative to the wind which improves the prediction.

Preferably, the times prior to time t1 can be times around a time t2 that corresponds to the time t1 less the delay related to the displacement speed of the wind. In other words, time t2 can be determined by use of delay index $k_{d0}$ with a formula:

$$t2=t1-k_{d0} \times T_s.$$

with $T_s$ being the sampling period of the measurement.

The prior times accounted for in the model can then be times t, such that:

$$t=t2 \pm n \times T_s$$

with n being a positive or zero integer less than or equal to Nd, which is the order of the wind evolution model.

According to an embodiment of the invention, the wind evolution model can be written as follows:

$$u_0(k+p)=\tilde{U}_{x_1}(k-k_{d0}+p)^T r(k|k)$$

$$\tilde{U}_{x_1}(k-k_{d0}+p)=[\tilde{u}_{x_1}(k-k_{d0}+p)\tilde{u}_{x_1}(k-k_{d0}+p-1)\tilde{u}_{x_1}(k-k_{d0}+p+1)\ldots\tilde{u}_{x_1}(k-k_{d0}+p+N_d)]^T$$

$$\tilde{u}_{x_1}(k)=a_{0,x_1}u_{x_1}(k)$$

with $u_0$ being the wind in the rotor plane, k being the discretized time, p being the future time step, $k_{d0}$ being the delay index, r being the state vector determined by the Kalman filter (in step 5), $x_1$ being the measurement plane, $N_d$ being the order of the wind evolution model, $u_{x1}$ being the wind speed measured in the measurement plane (optionally reconstructed) and $a_{0,x1}$ being the induction factor between the measurement plane and the rotor plane determined in step 2.

Preferably, in order to limit the computation time, the order of the wind evolution model $N_d$ can be 2.

5. Determination of the Wind Speed Prediction

In order to apply the wind evolution model constructed in the previous step to determine the wind speed prediction in the rotor plane, a Kalman filter is applied to determine the state vector r of the wind evolution model. Preferably, an adaptive Kalman filter is applied.

For this step, the notations n(k), p(k), J(k), P0, Q and R are specific to this step (the same notations are used independently in step 2).

According to an embodiment of the invention, this step identifies vector r defined by values $r_0, r_{-1}, r_1, \ldots, r_{-Nd}, r_{Nd}$. To characterize the variable nature of the wind evolution, the following model is used: $j=-N_d, -N_d+1, \ldots, 0, \ldots, N_d-1, N_d$.

where $n_j(k-1)$ is used to describe the variation of $r_j(k)$.

This equation can be rewritten in compact vector form:

$$r(k) = r(k-1) + \eta(k-1)$$

où

$$\begin{cases} r(k) = [r_0(k) \quad r_{-1}(k) \quad r_1(k) \quad \ldots \quad r_{-N_d}(k) \quad r_{N_d}(k)]^T \\ \eta(k) = [\eta_0(k) \quad \eta_{-1}(k) \quad \eta_1(k) \quad \ldots \quad \eta-N_d(k) \quad \eta N_d(k)]^T \end{cases} ;$$

This can then be written:

$$\tilde{U}_{x_2}(k-k_d)^T r(k)=u_{x_1}(k)$$

with $$U_{x_2}(k-k_d)=[\tilde{u}_{x_2}(k-k_d)\tilde{u}_{x_2}(k-k_d-1)\tilde{u}_{x_2}(k-k_d+1)\ldots\tilde{u}_{x_2}(k-k_d+N_d)]^T$$

It is noted that the values of u in this equation are estimated values containing noises. A more realistic model of this equation can therefore be:

$$(\tilde{U}_{x_2}(k-k_d)^T+\epsilon_{x_2}(k-k_d)^T)r(k)=u_{x_1}(k)+\epsilon_{x_1}(k)$$

where $\epsilon_{x1}(k)$ and $\epsilon_{x2}(k-k_d)$ are noises for $u_{x1}(k)$ and $\tilde{U}_{x2}(k-k_d)$ respectively. The previous equation can then be rewritten as follows:

$$\tilde{U}_{x_2}(k-k_d)^T r(k)=u_{x_1}(k)+\epsilon_{x_1}(k)-\epsilon_{x_2}(k-k_d)^T r(k)$$

The following state space equation can then be obtained:

$$\begin{cases} r(k) & = r(k-1)+\eta(k-1) \\ \tilde{U}_{x_2}(k-k_d)^T r(k) & = u_{x_1}(k)+\mu(k) \end{cases}$$

with $$\mu(k) = \epsilon_{x_1}(k) - \epsilon_{x_2}(k-k_d)^T r(k)$$

$\mu(k)$ being the measurement noise. It needs to be noted that this noise depends on the estimation of state r(k). In other words, the covariance matrix of the measurements is a function of r(k).

One way of estimating the unknown state vector r(k) that accounts for information on η(k) and μ(k) applies a Kalman filter. In practice, the Kalman filter provides the solution to the following problem:

$$\min_{r(k)} J(k)$$

with $$J(k) = (r(0) - \bar{r}(0))^T P_0^{-1}(r(0) - \bar{r}(0)) + \sum_{j=1}^{k}(\eta(j-1)^T Q^{-1}\eta(j-1) + \mu(j)^T R^{-1}\mu(j))$$

where $P_0$, Q, R are weighting matrices of suitable dimension and $\bar{r}(0)$ is the mean value of r(0).

In order to solve the optimization problem using the Kalman filter, the following assumptions are made. These assumptions mainly relate to a mathematical interpretation for $P_0$, Q, R.

r(0) is a random vector not correlated with noises η(k) and μ(k), r(0) has a known mean $\bar{r}(0)$ with P0 being the covariance matrix, that is:

$$P0 = E[(r(0) - \bar{r}(0))(r(0) - \bar{r}(0))^T]$$

η(k) and μ(k) are white noise processes with zero mean and are not correlated, i.e.:

$$E[(\eta(k)\eta(j)^T)] = 0, \forall k \neq j,$$
$$E[(\mu(k)\mu(j)^T)] = 0, \forall k \neq j,$$
$$E[(\eta(k)\mu(j)^T)] = 0, \forall k, j$$

η(k) has a covariance matrix Q, that is:

$$E[\eta(k)\eta(k)^T] = Q$$

For the measurement noise, it is obtained:

$$E[\eta(k)\eta(k)^T] = E[(\epsilon_{x_1}(k) - \epsilon_{x_2}(k-k_d)^T r(k))(\epsilon_{x_1}(k) - \epsilon_{x_2}(k-k_d)^T r(k))^T]$$

$$E[\eta(k)\eta(k)^T] = E(\epsilon_{x_1}(k)\epsilon_{x_1}(k)^T) + r(k)^T E(\epsilon_{x_2}(k-k_d)\epsilon_{x_2}(k-k_d)^T)r(k)$$

$$R = E(\epsilon_{x_1}(k)\epsilon_{x_1}(k)^T) + r(k)^T E(\epsilon_{x_2}(k-k_d)\epsilon_{x_2}(k-k_d)^T)r(k)$$

It can be noted that the covariance matrix of the measurement noise depends on the estimated state r(k).

The following notations are adopted:

r(k|k−1) is the estimation of r(k) from the time k−1 r(k|k) is the estimation of r(k) from the measurements of time k

P(k|k−1) is the error covariance matrix of r(k) from the measurements of time k−1

P(k|k) is the error covariance matrix of r(k) from the measurements of time k.

The Kalman filter can then be summarized as follows:

Prediction $$\begin{cases} r(k|k-1) &= r(k-1|k-1) \\ P(k|k-1) &= P(k-1|k-1) + Q \end{cases}$$

Correction $$\begin{cases} S(k) &= \tilde{U}_{x_2}(k-k_d)P(k|k-1)\tilde{U}_{x_2}(k-k_d)^T + R \\ K(k) &= P(k|k-1)\tilde{U}_{x_2}(k-k_d)^T S(k)^{-1} \\ r(k|k) &= r(k|k-1) + K(k)(u_{x_1}(k) - \tilde{U}_{x_2}(k-k_d)r(k|k-1)) \\ P(k|k) &= (I - K(k))P(k|k-1) \end{cases}$$

Thus, this Kalman filter allows determination of state vector r, which is then integrated in the wind evolution model determined in the previous step, in order to determine the wind prediction in the rotor plane.

The present invention also relates to a method of controlling a wind turbine equipped with a LiDAR sensor. The following steps are carried out for this method:

predicting the wind speed in the rotor plane by use of the wind speed prediction method according to any one of the above variants; and controlling the wind turbine according to the wind speed in the rotor plane.

Accurate real-time prediction of the wind speed in the rotor plane allows suitable wind turbine control in terms of minimization of the effects on the wind turbine structure and maximization of the recovered power. Indeed, by use of this control, the LiDAR allows reduction of the loads on the structure, with the blades and the tower representing 54% of the cost. Therefore, using a LiDAR sensor allows optimizing the wind turbine structure and thus decreasing the costs and maintenance.

According to an implementation of the invention, the inclination angle of at least one of the blades and the electrical recovery torque of the wind turbine generator can be controlled as a function of the wind speed. Other types of regulation devices can also be used.

According to an embodiment of the invention, the inclination angle of at least one of the blades and the electrical recovery torque are determined by use of wind turbine maps as a function of the wind speed at the rotor. For example, the control method described in French patent application FR-2,976,630 A1 corresponding to US published patent application 2012/0,321,463 can be applied.

Furthermore, the invention relates to a computer program product comprising code instructions designed to carry out the steps of one of the methods described above (method of determining the wind speed in the rotor plane, control method). The program is executed on a processor which provides processing for the LiDAR sensor, or on any similar medium connected to the LiDAR sensor or to the wind turbine.

According to an aspect, the present invention also relates to a LiDAR sensor for a wind turbine, comprising a processing unit configured to implement one of the methods described above (method of determining the wind speed in the rotor plane, control method).

According to an implementation of the invention, the LiDAR sensor can be a scanning LiDAR, a continuous wave LiDAR or a pulsed LiDAR sensor. Preferably, the LiDAR sensor is a pulsed LiDAR sensor.

The invention also relates to a wind turbine, notably an offshore or an onshore wind turbine equipped with a LiDAR sensor as described above. According to an embodiment of the invention, the LiDAR sensor can be arranged on the nacelle of the wind turbine or in the nose of the wind turbine. The LiDAR sensor is oriented to perform a measurement of the wind upstream from the wind turbine (that is before the wind turbine and along the longitudinal axis thereof, designated by axis x in FIG. 1). According to an embodiment, the wind turbine can be similar to the turbine illustrated in FIG. 1.

For the embodiment of the control method, the wind turbine can comprise a control, for example for control of the pitch angle of at least one blade of the wind turbine or of the electrical torque, for implementing the control method according to the invention.

Examples

The features and advantages of the prediction method according to the invention will be clear from reading the comparative examples presented hereafter.

For these examples, the wind speed in the rotor plane is predicted with a method according to the prior art wherein Taylor's frozen turbulence hypothesis is applied and the wind speed in the rotor plane is predicted with a method according to the invention, for a wind turbine equipped with a LiDAR sensor.

In order to validate the method according to the invention, it is assumed that the wind turbine is in the measurement plane at 50 m. Thus, by use of the measurements of the LiDAR sensor, a reference is considered which is the averaged measured wind speed in the measurement plane at 50 m, and the method according to the prior art and the method according to the invention is used to estimate the wind speed in the measurement plane at 50 m from a measurement plane distant from the measurement plane at 50 m, for example a measurement plane at 100 m.

Figure 4:
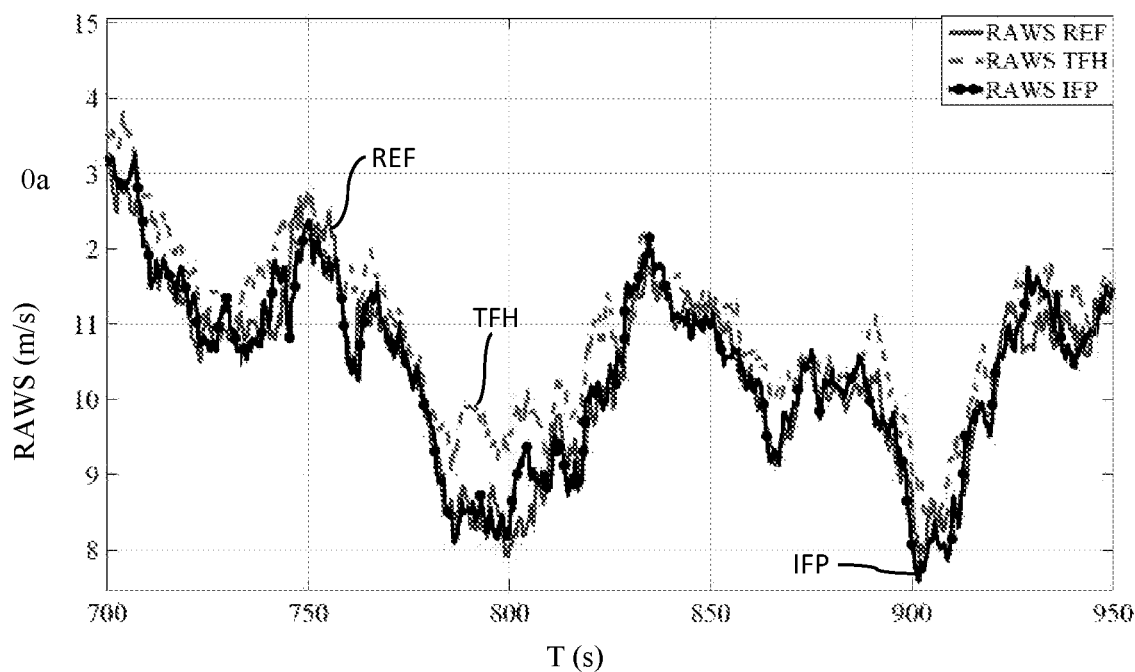
FIG. 4 illustrates a comparative curve in relation to a reference wind for an example of a prediction at 0s of the wind in the rotor plane for a method according to the prior art and for the prediction method according to an embodiment of the invention.

FIG. 4 is a curve illustrating the averaged wind speed in the rotor plane RAWS (average wind speed in the rotor plane in the area formed by the turbine blades) in m/s as a function of time T in s. FIG. 4 corresponds to a prediction at the time t=0s (real time). This figure shows the averaged reference wind speed REF, the averaged wind speed predicted with a method according to the prior art AA wherein Taylor's frozen turbulence hypothesis is applied and the averaged wind speed is predicted with a method according to the invention INV. It is noted that the wind speed estimated with the method according to the invention INV is more representative of reference speed REF than the wind speed estimated with the method according to the prior art AA.

Figure 5:
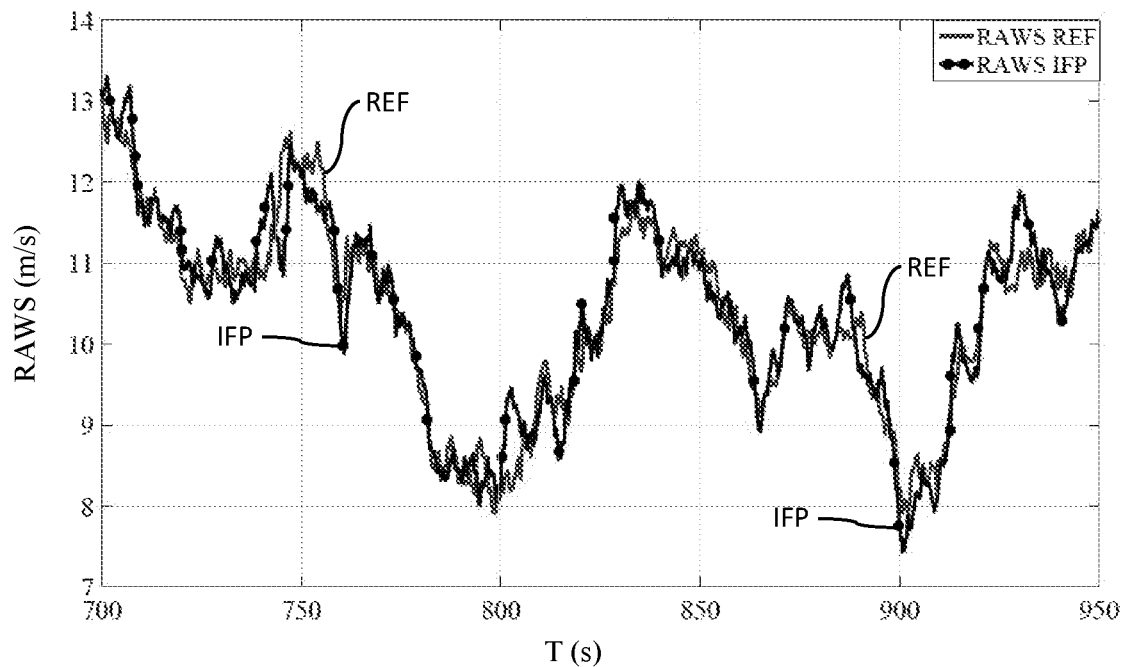
FIG. 5 illustrates a comparative curve in relation to a reference wind for an example of the prediction at 1s of the wind in the rotor plane for a method according to an embodiment of the invention.

FIG. 5 is a curve illustrating the averaged wind speed in the rotor plane RAWS in m/s as a function of time T in s. FIG. 5 corresponds to a prediction at the time t=1 s (prediction at 1s of the real time). This figure shows the averaged reference wind speed REF and the averaged wind speed predicted with a method according to the invention INV. It is noted that the wind speed estimated with the method according to the invention INV is close to reference speed REF.

Figure 6:
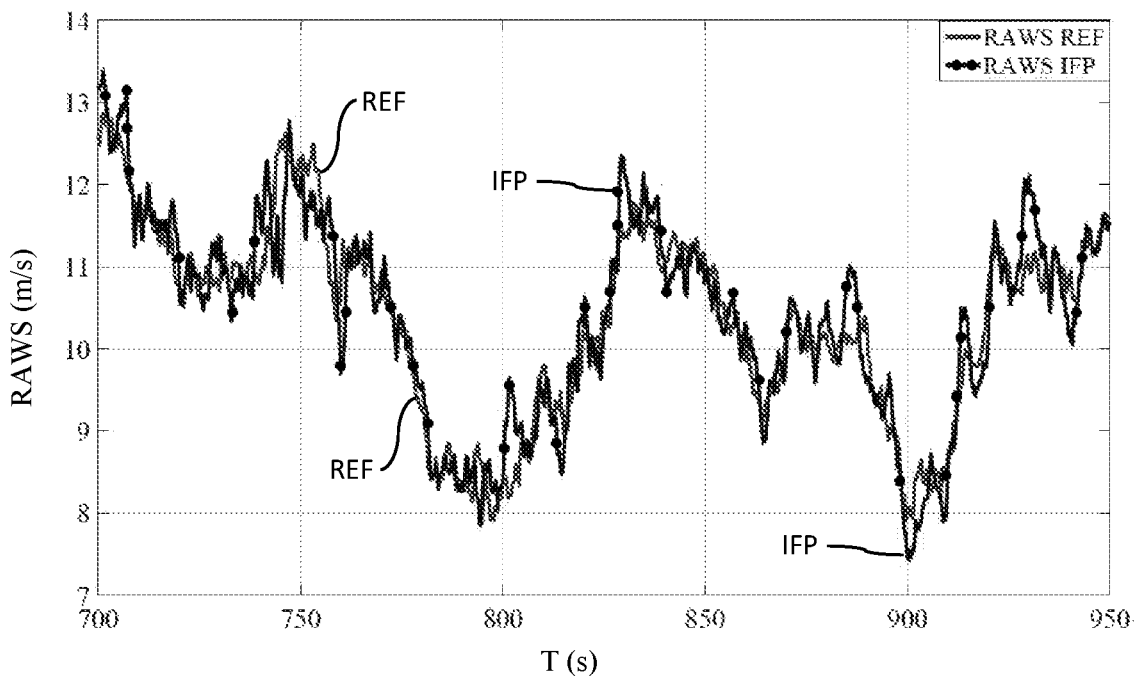
FIG. 6 illustrates a comparative curve in relation to a reference wind for an example of the prediction at 2s of the wind in the rotor plane for a method according to an embodiment of the invention.

FIG. 6 is a curve illustrating the averaged wind speed in the rotor plane RAWS in m/s as a function of time T in s. FIG. 6 corresponds to a prediction at the time t=2s (prediction at 2s of the real time). This figure shows the averaged reference wind speed REF and the averaged wind speed predicted with a method according to the invention INV. It is noted that the wind speed estimated with the method according to the invention INV is close to reference speed REF.

The method according to the invention provides a wind speed prediction in the rotor plane having good accuracy.

The invention claimed is:

1. A method for predicting wind speed in a rotor plane of a wind turbine equipped with a LiDAR sensor, comprising:

a) measuring the wind speed in at least one measurement plane distant from the wind turbine by use of the LiDAR sensor;
b) determining a wind induction factor, representing a wind deceleration coefficient between the measurement plane and the plane of the rotor;
c) determining a delay index $k_{d0}$ between the measurement plane and the rotor plane of the wind turbine by use of the induction factor and the wind speed measurement in the measurement plane by use of an equation $$k_{d0} = \frac{2x_1}{(U_{x1} + U_0)T_s};$$

with $U_0 = a_{0,x_1} U_{x_1}$, with $x_1$ being the distance between the measurement plane and the rotor plane, $T_s$ being the measurement sampling period, $U_{x_1}$ being an average wind speed measured in the measurement plane, $U_0$ being an average wind speed in the rotor plane and $a_{0,x_1}$ being the induction factor between the measurement plane and the rotor plane;
d) constructing a wind evolution model between the measurement plane and the plane of the rotor, the wind evolution model connecting the wind speed in the plane of the rotor at a predetermined time to the measured wind speed in the measurement plane at times prior to the predetermined time, by use of the induction factor with the prior times being determined by use of the delay index; and
e) determining the wind speed prediction in the rotor plane by use of the wind evolution model and a Kalman filter.

2. A prediction method as claimed in claim 1, wherein a wind induction factor is determined by carrying out the following steps:
i) measuring wind speed in at least three measurement planes distant from the wind turbine by use of the LiDAR sensor;
ii) determining at least two wind induction factors between two of the measurement planes using the wind speed measurements in the measurement planes and a linear Kalman filter; and
iii) determining the wind induction factor between a measurement plane and the rotor plane of the wind turbine by use of the determined induction factors between two measurement planes and using a linear Kalman filter.

3. A prediction method as claimed in claim 2, wherein the wind speed measurement step comprises reconstructing a wind field in the measurement plane which is used in other steps of the method as for wind speed measurement in the measurement plane.

4. A prediction method as claimed in claim 2, wherein the wind evolution model is expressed as follows:

$$u_0(k+p) = \tilde{U}_{x_1}(k - k_{d0} + p)^T r(k|k),$$

with $$\tilde{U}_{x_1}(k - k_{d0} + p) = [\tilde{u}_{x_1}(k - k_{d0} + p) \tilde{u}_{x_1}(k - k_{d0} + p - 1) \tilde{u}_{x_1}(k - k_{d0} + p + 1) \ldots \tilde{u}_{x_1}(k - k_{d0} + p + N_d)]^T$$

and $\tilde{u}_{x_1}(k) = a_{0,x_1} u_{x_1}(k)$, with $u_0$ being the wind in rotor plane, k being discretized time, p being a future time step, $k_{d0}$ being the delay index, r being a state vector determined by the Kalman filter, $x_1$ being a measurement plane, $N_d$ being an order of the wind evolution model, $u_{x_1}$ being wind speed measured in the measurement plane and $a_{0,x_1}$ being the induction factor between the measurement plane and the rotor plane.

5. A prediction method as claimed in claim 1, wherein the wind speed measurement step comprises reconstructing a wind field in the measurement plane which is used in other steps of the method as for wind speed measurement in the measurement plane.

6. A prediction method as claimed in claim 5, wherein the wind evolution model is expressed as follows:

$$u_0(k+p) = \tilde{U}_{x_1}(k-k_{d0}+p)^T r(k|k),$$

with $$\tilde{U}_{x_1}(k-k_{d0}+p) = [\tilde{u}_{x_1}(k-k_{d0}+p)\tilde{u}_{x_1}(k-k_{d0}+p-1)\tilde{u}_{x_1}(k-k_{d0}+p+1) \ldots \tilde{u}_{x_1}(k-k_{d0}+p+N_d)]^T$$

and $\tilde{u}_{x_1}(k) = a_{0,x_1} u_{x_1}(k)$, with $u_0$ being the wind in rotor plane, k being discretized time, p being a future time step, $k_{d0}$ being the delay index, r being a state vector determined by the Kalman filter, $x_1$ being a measurement plane, Nd being an order of the wind evolution model, $u_{x_1}$ being wind speed measured in the measurement plane and $a_{0,x_1}$ being the induction factor between the measurement plane and the rotor plane.

7. A prediction method as claimed in claim 1, wherein the wind evolution model is expressed as follows:

$$u_0(k+p) = \tilde{U}_{x_1}(k-k_{d0}+p)^T r(k|k),$$

with $$\tilde{U}_{x_1}(k-k_{d0}+p) = [\tilde{u}_{x_1}(k-k_{d0}+p)\tilde{u}_{x_1}(k-k_{d0}+p-1)\tilde{u}_{x_1}(k-k_{d0}+p+1) \ldots \tilde{u}_{x_1}(k-k_{d0}+p+N_d)]^T$$

and $\tilde{u}_{x_1}(k) = a_{0,x_1} u_{x_1}(k)$, with $u_0$ being the wind in rotor plane, k being discretized time, p being a future time step, $k_{d0}$ being the delay index, r being a state vector determined by the Kalman filter, $x_1$ being a measurement plane, $N_d$ being an order of the wind evolution model, $u_{x_1}$ being wind speed measured in the measurement plane and $a_{0,x_1}$ being the induction factor between the measurement plane and the rotor plane.

8. A prediction method as claimed in claim 7, wherein an order of the wind evolution model Nd is 2.

9. A method of controlling a wind turbine equipped with a LiDAR sensor, comprising steps of:
   a) determining the wind speed prediction in the rotor plane of the wind turbine by use of the method as claimed in claim 1; and
   b) controlling the wind turbine as a function of the wind speed in the rotor plane.

10. A non-transiently recorded computer program product, comprising code instructions for carrying out the method of claim 1, when the program is executed on a processor which performs processing for the LiDAR sensor.

11. A LiDAR sensor for a wind turbine, comprising a processing unit which implements a non transiently recorded method which performs a method as claimed in claim 1.

12. A wind turbine comprising a LiDAR sensor as claimed in claim 11, wherein the LiDAR sensor disposed on a nacelle of the wind turbine or in a nose of the wind turbine.

* * * * *